United States Patent [19]

Sorenson

[11] 4,331,730

[45] May 25, 1982

[54] FIBROUS WEB STRUCTURE

[75] Inventor: Wayne P. Sorenson, Appleton, Wis.

[73] Assignee: American Can Company, Greenwich, Conn.

[21] Appl. No.: 260,124

[22] Filed: May 4, 1981

Related U.S. Application Data

[63] Continuation of Ser. No. 58,902, Jul. 19, 1979, abandoned.

[51] Int. Cl.[3] .......................... B32B 7/00; B32B 21/08; B32B 21/02

[52] U.S. Cl. .................................... 428/286; 428/284; 428/296; 428/297; 428/298; 428/299; 428/303; 428/903

[58] Field of Search ............... 428/224, 284, 286, 297, 428/298, 299, 903, 300, 296, 301, 302, 303, 511, 537

[56] References Cited

U.S. PATENT DOCUMENTS

| | | | |
|---|---|---|---|
| 2,958,919 | 11/1960 | Pakner | 28/260 |
| 3,001,242 | 9/1961 | Heffelfinger | 264/115 |
| 3,024,149 | 3/1962 | Manning | 264/114 |
| 3,916,447 | 11/1975 | Thompson | 428/903 |
| 4,014,635 | 3/1977 | Hroyer | 425/83.1 |
| 4,064,605 | 12/1977 | Akiyamo et al. | 28/103 |
| 4,100,324 | 7/1978 | Anderson et al. | 428/288 |
| 4,142,016 | 2/1979 | Perry | 428/284 |
| 4,146,417 | 3/1979 | Drelich et al. | 428/288 |
| 4,198,460 | 4/1980 | Hiss | 428/284 |

*Primary Examiner*—James J. Bell
*Attorney, Agent, or Firm*—Robert P. Auber; George P. Ziehmer; Harry W. Hargis, III

[57] ABSTRACT

Apparatus for the deposition of a uniform web of dry wood pulp fibers on a forming wire in combination with melt blowing die means operable to deposit melt blown fibers on the web of dry fibers to strengthen the web. Means for depositing the webs comprise serially disposed sets of fiber distributors, and the die means is disposed between the sets of fiber distributors so that the melt blown fibers are deposited as separate layers on the finished web.

1 Claim, 4 Drawing Figures

FIBROUS WEB STRUCTURE

This is a continuation of application Ser. No. 58,902, filed July 19, 1979, now abandoned.

BACKGROUND OF THE INVENTION

This invention relates to improvements in the manufacture of fibrous webs, such as, for example, paper and the like.

In manufacturing fibrous web products it is known to form individual webs from dry wood fibers, and thereafter to join the webs as plies of a multi-ply product to improve its strength and impart desirable bulk thereto.

The manufacture of webs of this type is disclosed in U.S. Pat. No. 4,014,635 to Kroyer. It has been found desirable to enhance the strength of an air-laid web of loose fibers formed according to teachings of this patent to facilitate its rapid, continued transfer from a web forming station and wire to an embossing press and latex addition station, in the manufacture of multi-ply structure.

The following U.S. patents are representative of prior art believed material to the examination of this application:

U.S. Pat. No. 4,100,324 discloses a nonwoven fabric, and method of producing same, comprising a matrix of thermoplastic polymer microfibers and wood pulp fibers disposed therein.

U.S. Pat. No. 3,016,599 discloses an extruder for directing microfibers into a stream of staple fibers to form a web.

U.S. Pat. No. 4,064,605 discloses an extruder for forming and directing filaments through a guide onto a screen to form a web.

U.S. Pat. No. 2,958,919 discloses glass insulation filaments extruded, attenuated, and grouped into crimped bulking fibers which are mixed with other micro-fibers to form a web.

U.S. Pat. No. 3,024,149 discloses long, discontinuous filaments fed in a common stream with other fibers onto a belt.

U.S. Pat. No. 3,001,242 discloses extrusion nozzles that emit fiber strands that are attenuated and broken by air streams containing yarn fibers.

It is a general objective of this invention to provide improvements in the manufacture of air laid fiber webs.

It is a further objective of the invention to provide improved apparatus for manufacturing air laid fiber webs of enhanced strength.

It is another objective of the invention to provide an improved method for forming air laid fiber webs of enhanced strength.

It is a still further objective to provide an apparatus and process for improving the strength of air laid fiber webs to facilitate handling thereof in the formation of multi-ply fibrous sheet structure.

SUMMARY OF THE INVENTION

In achievement of the foregoing as well as other objectives and advantages, the invention comtemplates improvements in the manufacture of air laid fiber webs wherein serially arranged sets of fiber distributors are disposed and adapted to lay dry fibers on a forming wire, and melt blowing die means is disposed between the sets of fiber distributors so that the melt blown fibers are applied separately to form an intermediate strength enhancing layer of the finished web.

The manner in which the foregoing as well as other objectives and advantages of the invention may best be achieved will be more fully understood from a consideration of the following description, taken in light of the accompanying drawing.

DETAILED DESCRIPTION OF THE PREFERRED EMBODIMENTS AND PRACTICE OF THE INVENTION

Figure 1:
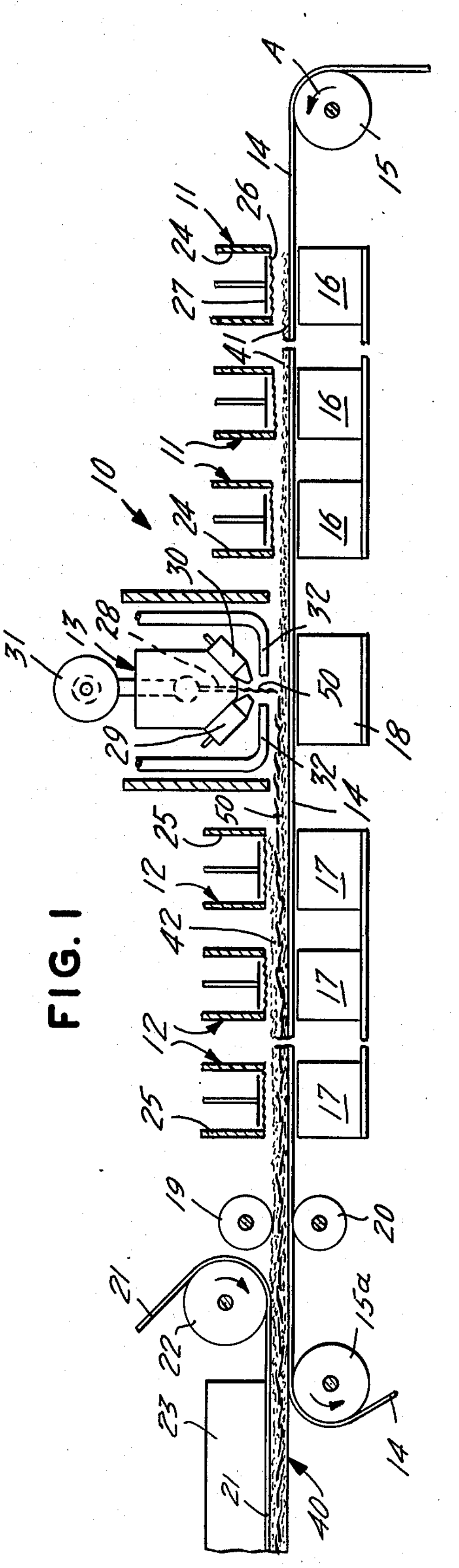
FIG. 1 is a somewhat diagrammatic side elevational showing, with parts broken away, of apparatus embodying the invention.

With more detailed reference to the drawing, and first to FIG. 1, a web forming apparatus 10 comprises a first set of dry fiber distributors 11, a second set of dry fiber distributors 12, and a melt blowing die 13 disposed therebetween. While three distributors per set are shown for convenience of illustration, as many as six per set are contemplated, it being preferred that, in any event, like numbers of distributors be provided to either side of a die. A forming wire 14 extends beneath the fiber distributor 11 and 12 and die 13. Forming wire 14 is endless, and is supported on suitably mounted rollers, two of which are seen at 15, **15*a*, so that it is linearly movable from right to left, as indicated by directional arrow A applied to roller 15. A first set of vacuum boxes 16 is disposed beneath wire 14 and set of distributors 11, and a second set of vacuum boxes 17 is disposed beneath the wire 14 and the set of distributors 12. A vacuum box 18 is disposed beneath the wire and the melt blowing die 13. A pair of compaction rolls 19 and 20 engage upper and lower surfaces of forming wire 14**.

Means for transporting the web from the forming wire 14 to subsequent operational stations (not shown) comprises a foraminous belt 21 driven on rollers, one of which is seen at 22, so that a straight run of the belt engages the upper surface of the air laid web 40, to be described in more detail, in a region thereof not subject to the influence of vacuum boxes 17. The same straight run of belt 21 extends across the open side of a downwardly presented vacuum box 23 so that the fiber web 40 will be continuously pulled from forming wire 14 and held on belt 21.

The fiber distributors of sets 11 and 12 comprise housings 24 and 25, respectively. Since each distributor is identical to the other, it need only be explained that a typical housing 24 includes a lower opening over which there extends a screen 26. A set of rotational impellers, one of which is seen at 27, are spaced transversely of the underlying forming wire 14, and are so disposed as respects screen 26 to force fibers, which have been introduced by known means into housing 24, through the screen and onto the forming wire. Simultaneously with this action, the underlying one of vacuum boxes 16 positively draws the fibers onto wire 14 where they are held in substantially evenly distributed array.

In further, and more particular accordance with the invention, the melt blowing die 13 includes a straight row of very small orifices 28 extending transversely (i.e. cross machine) of forming wire 14. Orifices 28 are supplied a molten polymer, such as, for example, polypropylene or polyethylene, from an extruder mechanism 31 of otherwise conventional construction. The size of orifices 28 is in the order of spinerets such as are used for extruding filamentary fibers. The die 13 further includes a pair of nozzles 29 and 30 disposed and adapted to direct convergent streams of heated air onto the streams of molten polymer flowing from orifices 28. The convergent air streams coact to attenuate the filamentary streams of molten polymer until they break and form reduced diameter "microfibers" in randomly oriented array. Polymeric microfibers per se and means for producing same are dealt with in the referenced U.S. Pat. No. 4,100,324. Generally, the lengths of melt blown microfibers are from about 5 inches to about 15 inches, and, as will be more fully appreciated from what follows, these lengths are substantially longer than the lengths, e.g., about $\frac{1}{8}$ inch, of usual wood pulp fibers.

In operation of the apparatus this far described, vacuum boxes 16, 17, 18, and 23 are energized, as are impellers 27, while forming wire 14 is continuously moved beneath the distributor housings 24 and 25. Also, belt 21 is moved with wire 14 and across the opening in vacuum box 23. As cellulosic, nonstaple fibers, for example wood fibers, are fed to the distributor housings 24, they are discharged uniformly over the surface of forming wire 14 therebeneath, with the aid of air flow through wire 14 into vacuum boxes 16. As the deposited fibers are formed into a first web portion 41, that web portion is moved by forming wire 14 beneath melt blowing die 13 where the elongate polymeric microfibers 50 are directed for random impingement onto the surface of the wood fiber web portion 41. Since the randomly oriented polymeric microfibers 50 are considerably longer than the wood fibers, they advantageously overlap or cross-one-another and many of the wood fibers to achieve a polymer bond that strengthens the web.

Figure 2:
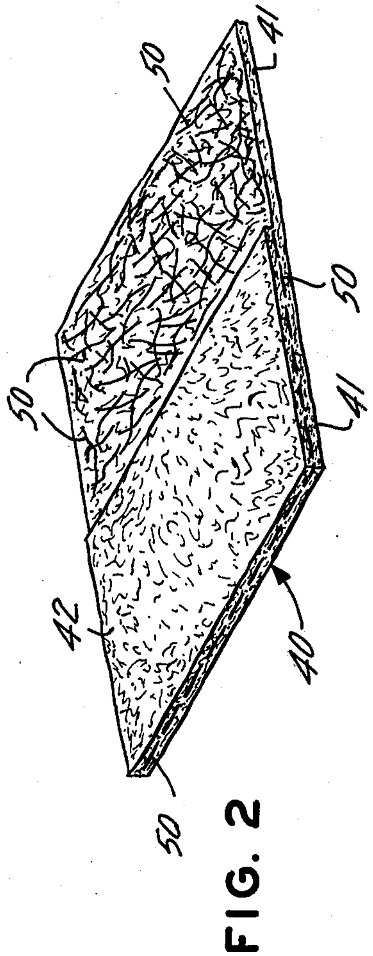
FIG. 2 is a fragmentary perspective showing of fiber web structure made by the apparatus of FIG. 1, in accordance with method aspects of the invention.

As the web and overlying polymeric microfibers 50 move beneath distributors 12, a second and similar wood fiber web portion 42 is formed over the polymer bearing surface of the first wood fiber web portion 42. The web structure thus achieved is seen at 40 in FIG. 2, where web portions 41 and 42 are reinforced by an inner layer of overlapping polymeric microfibers 50. This same web structure 40 is then passed between compaction rolls 19 and 20 and into contact with foraminous belt 21 to which it is transferred from wire 14, under the action of vacuum box 23. The reinforced web structure 40 is then ready for transport by belt 21 to an embossing press and latex application station (not shown).

Figure 3:
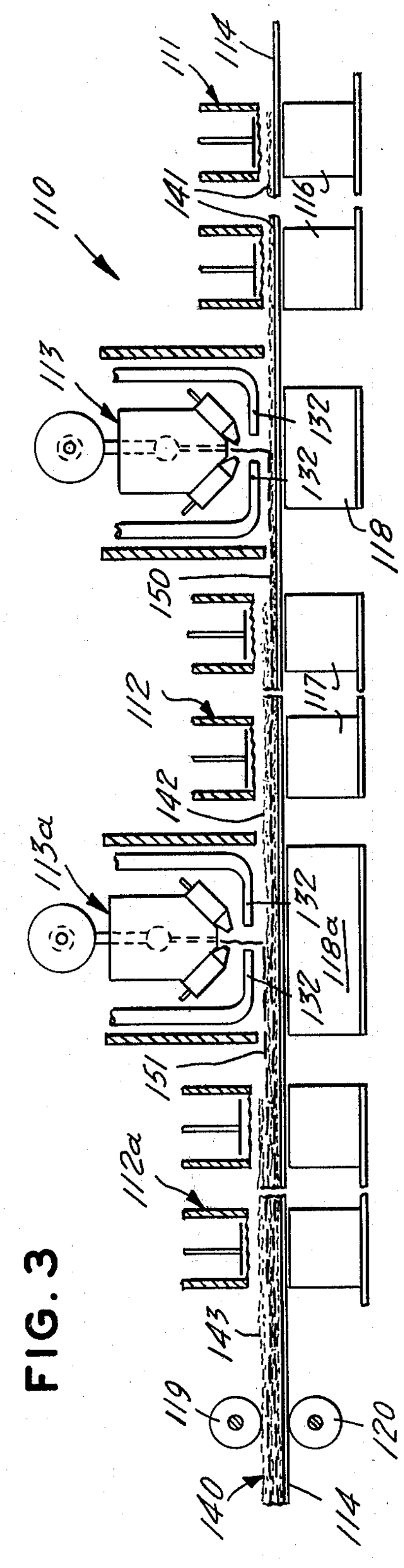
FIG. 3 is a showing, similar to FIG. 1, of a modified embodiment of apparatus contemplated by the invention.
Figure 4:
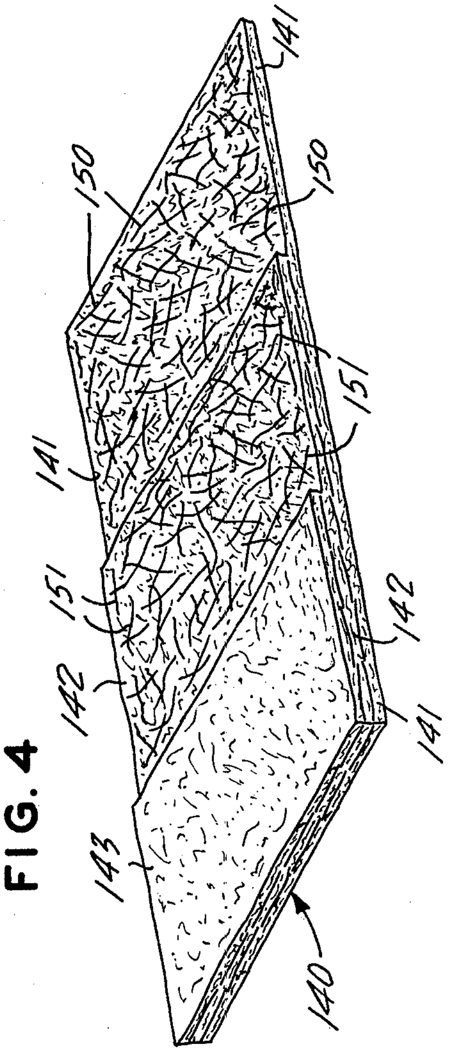
FIG. 4 is a showing, similar to FIG. 1, of web structure made by apparatus seen in FIG. 3.

With reference to FIG. 3, a modified apparatus 110 comprises three sets of fiber distributors 111, 112, and 112*a*. While two distributors per set are shown for convenience of illustration, it will be understood that three per set are contemplated. Disposed between each set of distributors are melt blowing dies 113, and 113*a*. As in the embodiment of FIG. 1, a forming wire 114 passes beneath the distributors and the dies, at the same time over vacuum boxes 116, 117, 117*a*, 118, and 118*a*, then between compaction rolls 119 and 120 for transfer to a suitable transfer belt. Operation of the apparatus 110 is the same as that of FIG. 1, the difference residing in the finished web structure 140 as is seen in FIG. 4. Web structure 140 is made up of three webs 141, 142, 143 interspersed by layers of filamentary, randomly laid overlapping fibers 150 and 151.

In either of the embodiments of apparatus seen in FIGS. 1 and 3, control of the filamentary fiber temperatures, in prevention of damage to the wood fibers, can be achieved by means of quench air discharge nozzles 32, 132, respectively, positioned in such array as to direct opposed jets of cooling air onto the filaments as they exit the melt blowing die.

From the foregoing description, it will be appreciated that the invention achieves improved fiber web construction and manufacture featured by deposition of loose melt blown polymeric microfibers independently of air laid wood fibers so that they are deposited as a layer of overlapping microfibers on surfaces of the air laid wood fibers. By such construction, the polymeric filaments both achieve a degree of bonding that enhances strength of the web, as is desirable when carrying out subsequent embossing and laminating operations, and advantageously enhance the bulk of the web, without adversely detracting from the absorbency of the wood fibers.

I claim:

1. A fibrous web comprising: at least a pair of layers of dry-laid nonstaple wood fibers of a predetermined length of about $\frac{1}{8}$ inch; and an intermediate layer consisting of randomly laid, overlapping melt-blown filamentary polymer fibers from about 5 inches to about 15 inches in length, said polymer fibers bonding said layers together.

* * * * *